United States Patent Office 3,451,397
Patented June 24, 1969

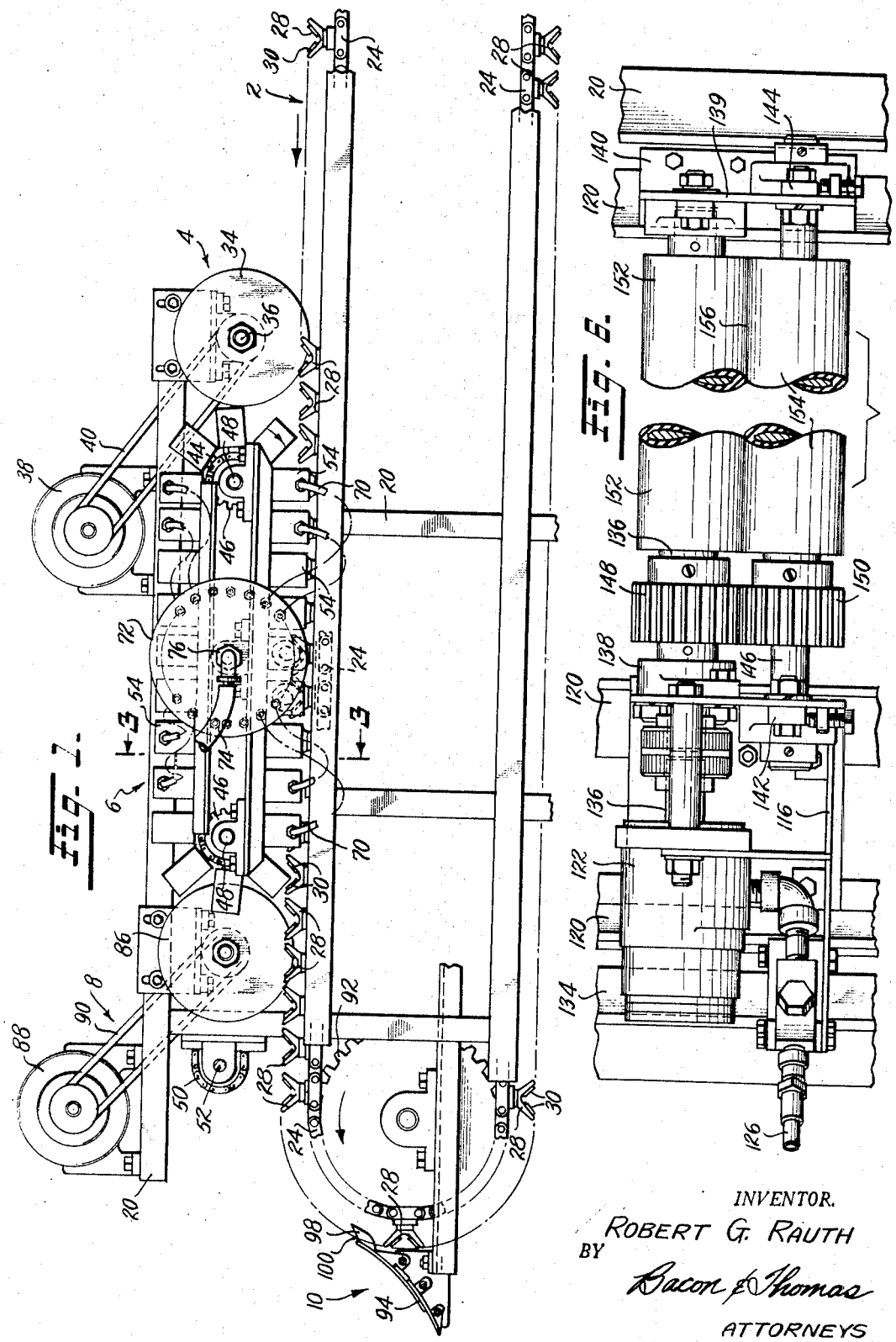

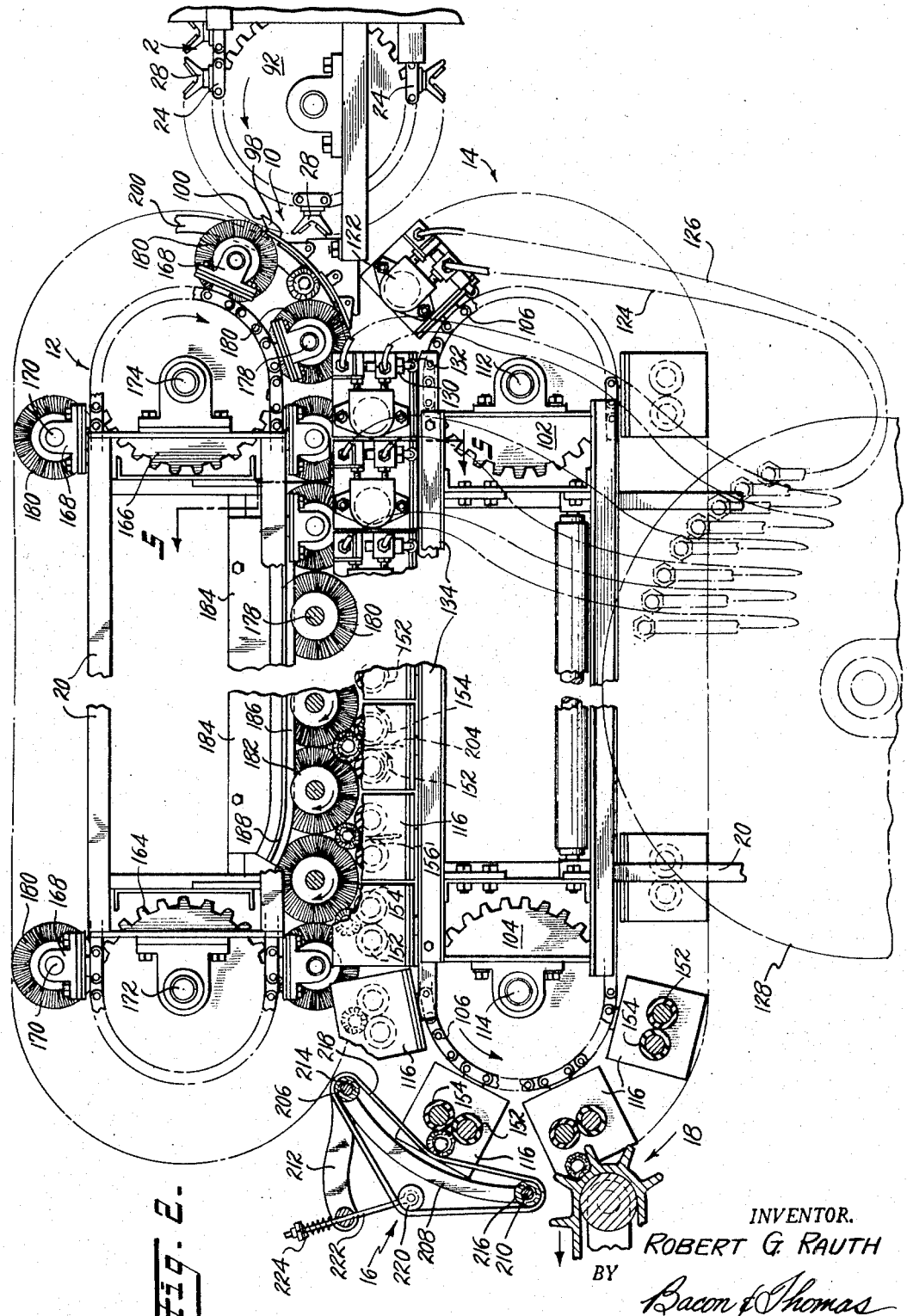

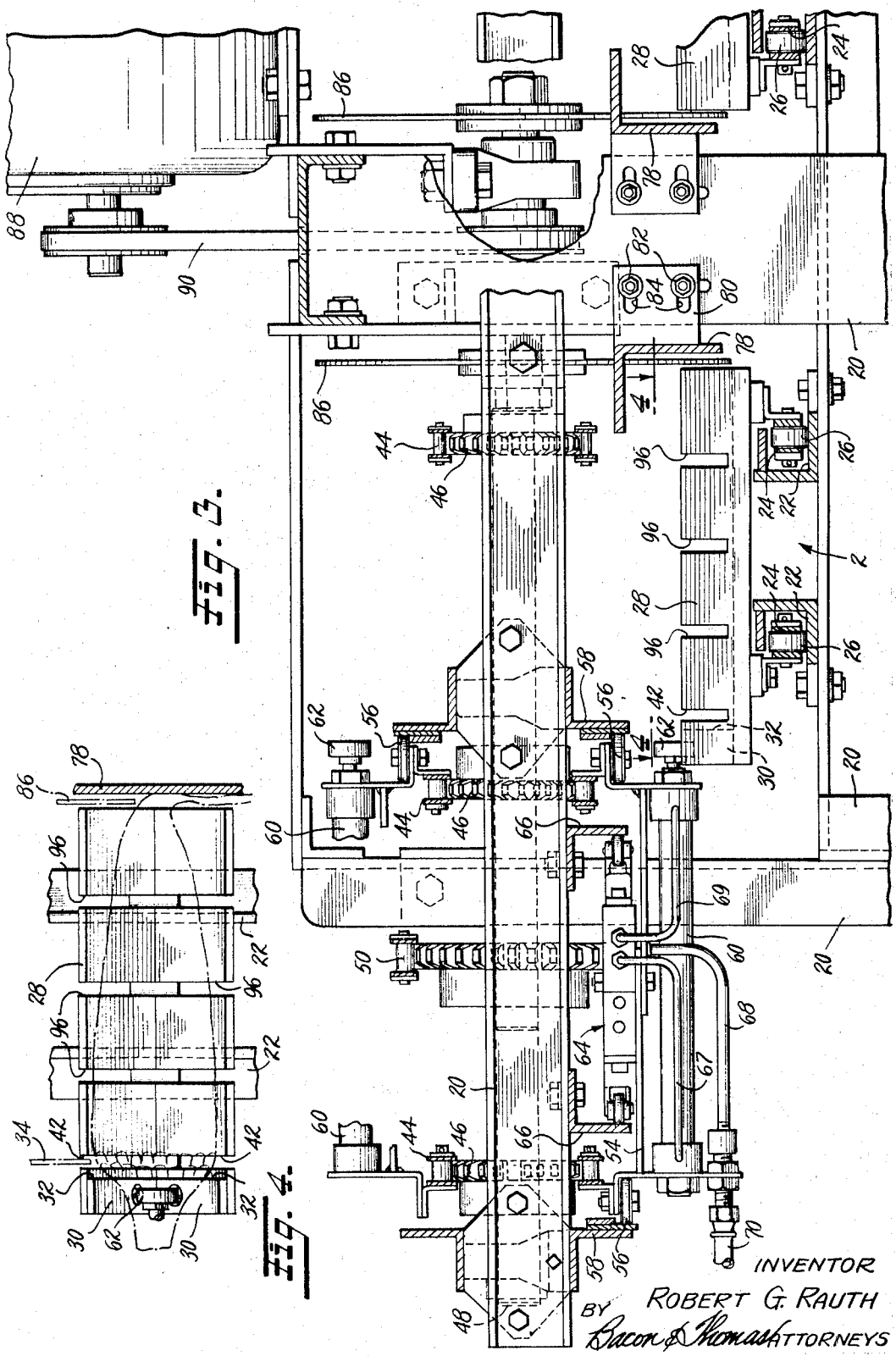

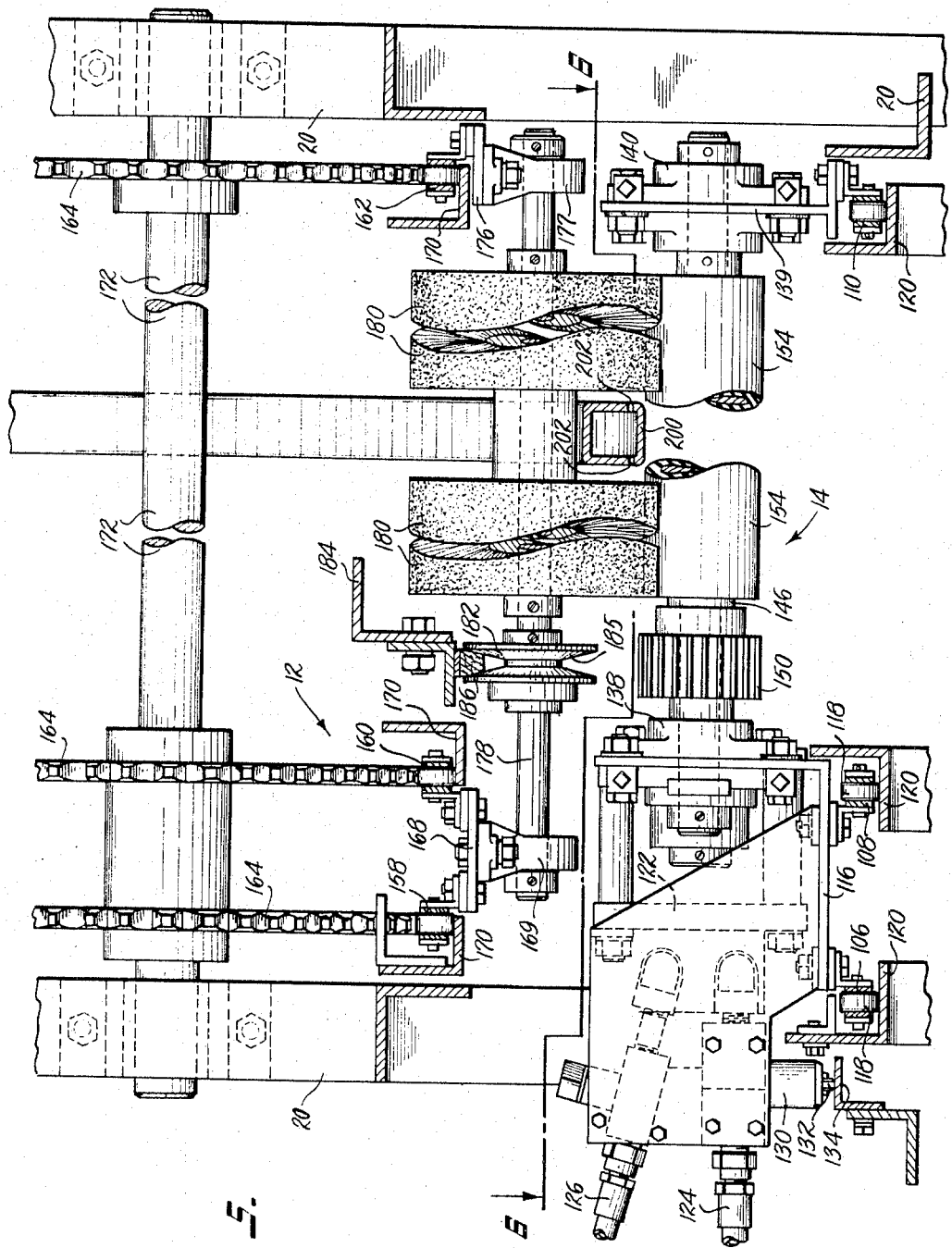

3,451,397
FRESH CORN TRIMMING AND HUSKING MACHINE
Robert G. Rauth, Del Ray Beach, Fla., assignor, by mesne assignments, to Flavor-Pict, Inc., Del Ray Beach, Fla., a corporation of Delaware
Filed Sept. 9, 1966, Ser. No. 578,251
Int. Cl. A01f *11/06;* A01d *23/04*
U.S. Cl. 130—5
18 Claims

ABSTRACT OF THE DISCLOSURE

A conveyor has transverse V-shaped troughs that carry ears of unhusked fresh corn past a butt trimmer and the ears are then pushed along the trough to press the tips and fold the projecting husks firmly against an abutment and the husk and tip are trimmed. The ears then pass onto husking rollers on a second conveyor and axially directed jets of air loosen the husks. Rotary brushes, movable with the second conveyor, over the ears, rotate to gently brush all silk and husk remnants from the ears.

---

This invention relates to a corn trimming and husking machine for trimming and husking ears of corn particularly fresh corn intended for immediate sale and use.

The preparation of ears of fresh corn for the market has heretofore presented problems in trimming the ears to proper length and removing the husks and silk therefrom efficiently and completely without damaging the product. As is known, rough handling of fresh corn on the cob often results in serious damage to the kernels, rendering the product unmarketable. It has been necessary heretofore to resort to considerable manual handling of the product, which increased the cost thereof and limited the quantity that could be processed efficiently.

The machine of the present invention includes novel structure wherein the only manual operation necessary is the placement of unhusked ears of corn, as they come from the field, on a feed conveyor and the apparatus then performs all necessary operations without further manual handling of the product. The feed conveyor referred to includes a trough-like support for each ear, having a V-shaped abutment in one end thereof. An ear of corn on the cob consists of kernels that terminate in a rather abrupt shoulder at the butt end of the ear, that shoulder being readily detectible even with the husks overlying the same. Manual placement of the unhusked ears involves placement of ears in successive troughs of the conveyor and pushing each ear in the direction of the butt end thereof until the abutment referred to engages and stops the shoulder defined by the last ring of kernels on the cob. This positions the ear relative to a butt trimming device so that the latter will cut through the cob and husks adjacent that shoulder and thus completely sever the butt stem and butt end of the husks from the cob without removing usable kernels of the corn. Thereafter the butt-trimmed ears are automatically moved laterally of the conveyor until the shoft tip ends thereof are arrested by an abutment at the other side of the feed conveyor. The pressure with which the ears are pushed against the abutment is sufficient to cause the soft tip end of the cob and the overlying husk to be bent laterally to such a degree that the smallest usable ring of kernels at the tip end are all pushed to a predetermined location relative to the abutment irrespective of the over-all length of that particular ear. A tip trimmer then trims all the ears in definite relation to the tip end to thus remove all of the unwanted material while retaining all of the usable kernels of the corn. Thereafter, the ears are delivered to a husking section of the machine wherein adjacent parallel husking rollers of more or less conventional construction receive the trimmed ears. The husking rolls, however, are mounted transversely on a further conveyor and are simultaneously rotated and advanced through the machine while overhead rotary brushes, moving in the same direction as the further conveyor, engage the ears on the husky rolls and serve not only to hold the ears in place on the husking rolls but also to loosen the husks and silk so that they may be grasped in the nip of the husking rolls and withdrawn from the ear. It has been found that the husking arrangement defined and claimed herein results in complete cleaning of each ear without damage to the same and permits operation at speeds heretofore unattainable. To assist in loosening the husks and silk, a jet of high pressure air is directed axially against the end of each ear, preferably the tip end, in the husking section of the machine, which jet of air assists in loosening the husks and flaring them outwardly to be grasped by the rollers.

While a specific embodiment of the invention will be described herein, it is to be understood that many modifications are contemplated and may be resorted to and the illustrated embodiment is by way of illustration only.

It is, therefore, a principal object of this invention to provide a fresh corn trimming and husking machine that will automatically and efficiently trim each ear the proper amount irrespective of its length and gently remove the husks and silk therefrom at high speeds of operation.

Another object of the invention is to provide a sub-combination of means whereby an unhusked ear of corn may be accurately trimmed at its butt and tip ends to retain all usable kernels of corn thereon.

Still another object of the invention is to provide a machine of the type set forth wherein a minimum of manual handling of the product is involved.

A further object is to provide such a machine embodying novel husk removing and ear cleaning means.

A further object is to provide a machine as set forth wherein the ears of fresh corn are handled gently at all times to eliminate damage thereto.

Other and additional objects and advantages will become apparent to those skilled in the art as the description proceeds with reference to the accompanying drawings wherein:

FIG. 1 is a somewhat schematic side elevational view of the trimmer section of the apparatus;

FIG. 2 is a somewhat schematic side elevation of the husker section of the apparatus with parts omitted for clarity of illustration;

FIG. 3 is an enlarged vertical sectional view taken on the line 3—3 of FIG. 1;

FIG. 4 is a horizontal sectional view as seen from the line 4—4 of FIG. 3;

FIG. 5 is an enlarged vertical sectional view taken on the staggered line 5—5 of FIG. 2; and FIG. 6 is a horizontal sectional view taken on the staggered line 6—6 of FIG. 5.

Throughout the views certain parts are shown in dotted line and other parts are omitted to simplify the illustration.

Referring first to FIGS. 1 and 2, the machine comprises generally an infeed conveyor 2 upon which ears of unhusked fresh corn are placed manually in a manner to be described. The feed conveyor carries the ears past a butt trimmer 4 (FIG. 1) where the butt end of the ear and husk are trimmed off. As the conveyor then continues to advance to the left, a second conveyor 6 carrying pneumatic pushers, causes the pushers to successively align themselves with the ears on the conveyor 2 and automatically operable valve means then actuate the pushers to push the ears laterally of the conveyor 2 to engage their tip ends with an abutment (to be described) and the ears are thus held in that position until the conveyor carries them past a tip trimmer assembly 8 where the tips are trimmed. The trimmed ears are then taken from the conveyor 2 by a delivery mechanism 10 and delivered to the husking section of the machine shown in FIG. 2. The delivery mechanism 10 positions successive ears of corn between separated brushes on a brush conveyor 12 and guides those ears to a position where they will meet and drop upon husking rolls carried by a lower conveyor 14. The lower or forward run of the husking rolls conveyor move in the same direction, to the left, as viewed in FIG. 2. Only while moving forwardly along their forward runs, the husking rolls are driven in rotation by means to be described. Also, only during movement along their forward runs, the brushes on the conveyor 12 are rotated about their axes in the same direction. Thus, the brushes will cause the ears of corn to rotate about their own axes and will at the same time loosen the husk and silk whereupon the latter may be grasped by the nip of the husking rolls and withdrawn from the ear. Also arranged along the path of movement of the ears of corn in the husking section of the machine are means to direct jets of high pressure air substantially axially of the ears of corn at their tip ends to thus loosen and flare outwardly the husks so that they may be readily grasped by the husking rolls. This husking function is performed as the conveyors 12 and 14 continue to move forwardly and is completed by the time the ears reach the ends of the forward runs of those conveyors. At that point rotation of the brushes and of the husking rolls stops, the brushes are separated from the husking rolls, leaving the ears of fresh corn on the latter. The husking roll conveyor then starts its return movement and unless prevented from doing so, the ears of fresh corn would drop off the rolls and become damaged. A hold-down mechanism 16 is provided to gently hold the ears against the husking rolls until they reach about the level of a take-away conveyor 18 which delivers them to a further trimming and grading machine, not a part of the present invention.

As will be evident from FIGS. 3 and 5, the machine contemplates two parallel conveyors and duplicate side-by-side mechanisms as described. However, since the conveyors and all associated mechanisms on both sides of the machine are duplicates and driven in unison, only one side of the machine will be described in detail.

Referring again to FIGS. 1, 3 and 4, the trimming section of the machine includes suitable frame members 20 defining trackways 22 (FIG. 3) upon which chains 24 of the conveyor 2 are guided by means of rollers 26. A pair of chains 24 is provided and corn carrier troughs 28 are mounted thereon to extend transversely of the direction of movement of the conveyor. Each trough 28 is of generally V-shape, opening upwardly, and provided with sloping side walls. Adjacent the outer edge of the conveyor 2 the side walls of the trough 28 are provided with abutment members 30, defining a V-shaped shoulder 32 facing inwardly of the troughs. As is known, an ear of corn consists of a cob having a butt stem extending from one end and rows of kernels on the cob. Overlying the cob and kernels are the husks which are attached to the butt stem and enclose the ear of corn and extend beyond the tip end thereof. The ends of the rows of kernels at the butt end of the ear define a ring of kernels which in turn define a rather sharp shoulder. This shoulder is detectible even though the husks are still on the ear. The operators who manually place the ears of corn on successive troughs 28 place them on the trough with their butt ends outermost and then while holding the ears firmly in the trough, they are pulled forwardly to project the butt stem over and through the V-shaped shoulder and until the butt ring of kernels engages that shoulder 32 (see FIG. 4). This places the ear in proper relationship to the trough for butt trimming. With the ears in that position, the conveyor 2 carries them past a butt trimmer 4 which is shown as a rotary cutter 34 mounted on a shaft 36, carried by the frame of the machine. The shaft 36 is driven in rotation by a motor 38 and through a suitable belt 40. The rotary cutter 34 may be a sharp cutting disc or a saw or the like, all of which are known in the art. As shown in FIGS. 3 and 4, the troughs 28 are each provided with a pair of aligned slots 42 through their side walls, adjacent the shoulder 32. The slots 42 thus accommodate the lower edge of the rotary cutter 34 and the same passes through those slots as the conveyor 2 advances. This ensures complete severing of the butt end of the unhusked ear to not only trim the cob but sever the husk from the butt stem. The unwanted portions of the ear drop into a suitable container, not shown. FIG. 3 shows the pneumatic pusher mechanism in greater detail. A plurality of conveyor chains 44 are trained over aligned sprockets 46, which in turn are carried by shafts 48 journalled on the frame of the machine. One of the shafts 48 is driven by a drive chain 50 and a counter shaft 52 which is driven in rotation, by means not shown, at the same linear speed as the conveyor 2. The conveyor 2 is driven by any suitable power source (not shown). As shown in FIG. 3, the two outermost conveyor chains 44 have secured thereto elongated brackets 54 provided with guide rollers 56 engaging guiding tracks 58 on the machine frame. The brackets 54 are spaced along the conveyor chains 44 a distance corresponding to the spacing of the troughs 28 on conveyor 2 and each bracket carries a pneumatic cylinder 60 in which a double-acting piston is mounted. A piston rod projects from the inner end of each cylinder 60 and is provided with a pusher head 62 thereon. The parts are so mounted and positioned that movement of the conveyor chains 44 will cause successive pusher heads 62 to be aligned axially with the ears of corn on the troughs 28. After the pushers have become aligned with the ears on trough 28, a double-acting valve mechanism 64 is actuated in one direction by cam tracks 66 on the machine frame to admit air under pressure, through conduit 67, to the outer end of the cylinder 60 and thus project the pusher head 62 laterally of the conveyor 2. As is apparent from FIG. 3, the pusher heads 62 are outwardly of the trimmed butt ends of the ears of corn and when actuated will engage that butt end and push the ears of corn toward the right, as seen in FIGS. 3 and 4.

Air under pressure is supplied to the valve mechanism 64 by conduits 68 carried by the brackets 54 and connected to flexible tubings 70. There is a flexible tube 70 extending from each bractet 54 in a loose condition to a rotary manifold 72 (FIG. 1). The rotary manifold 72 is connected to a source of air pressure through a hose 74 and by means of a rotary gland 76 of known construction air under pressure is provided to the rotary manifold 72 from whence it may be drawn through any one of the tubes 70. As will be obvious, rotation of the shafts 48 and orbital movement of the cylinders 60 with the upper conveyor 6 will cause the rotary manifold 72 to rotate and prevent entanglement of the flexible conduits 70. Thus, a supply of air under pressure is provided at each valve 64. The cam tracks 66 are arranged to actuate valve 64 so that the pusher head is caused to move as described shortly after it becomes aligned with one of the troughs 28 and is caused to be withdrawn to the position of FIG. 2, by directing pressure through conduit 69, at about the time the pusher reaches the end of its forward run, adjacent the tip trimmer 8.

An elongated abutment plate 78 is carried by the machine frame adjacent the inner ends of the troughs 28 and extends in the direction of travel of the conveyor 2. As shown in FIG. 3, the abutment plates 78 are carried by brackets 80 whereby they are adjustably mounted on the machine frame by means of bolts 82 passing through slots 84. In this manner the abutment plates 78 may be adjusted toward and from the ends of the troughs 28.

Referring now to FIG. 4, as the pusher head 62 pushes the butt-trimmed ear toward the right, the tip end of the ear of corn will engage the abutment plate 78 and sufficient air pressure is employed to firmly press the ear of corn against the plate 78. This results in a bending or deflection of the projecting husk and the soft tip portion of the cob so that the smallest ring of usable kernels of the corn at the tip end is positioned adjacent the inner end of the trough 28. As the trough on conveyor 2 passes the tip trimmer 8, the tip end of the cob and husk are cut off. The tip trimmer 8 includes a rotary cuter 86 closely adjacent the inner end of the trough 28 at which position the tip end of the cob and husks are trimmed. The tip trimmer 8 likewise comprises a rotary cutter 86 which may be either a sharpened disc or saw or the like and is mounted on the frame similarly to the but trimmer 4 and is driven by motor 88 through belt 90.

After the conveyor 2 passes through the tip trimmer 8, the chains 24 thereof pass around sprocket 92 to start their return run. As is obvious, the troughs 28 tilt in going around sprocket 92 and the trimmed but unhusked ears thereon would normally drop out of the troughs onto a delivery guide device 10 consisting of arcuate guide plates 94 adjustably mounted on the machine frame. However, since the ears of corn will sometimes wedge in or stick to the troughs 28, it is necessary to ensure that each is positively removed from its trough for delivery to the husker section. As shown in FIGS. 3 and 4, each trough 28 is provided with further aligned slots 96 in its side walls. The upper or leading edge of the delivery plate 94 is provided with a series of fingers 98, one being in position to enter each of the slots 96 and one being positioned to pass closely adjacent the tip end of the troughs 28 as they move downwardly around sprocket 92. These fingers 98 are each provided with a cam edge 100 which will engage under the ear of corn in a trough 28 and ensure that it be lifted from the trough for deposit on the delivery plate 94. The delivery mechanism 10 is shown at the left end of FIG. 1 in its relationship to the trimmer section just described and is also shown near the right hand end of FIG. 2 in its relationship to the husking section of the machine.

The husking section of the machine, as previously descirbed, comprises a lower conveyor 14 and an upper conveyor 12. The lower conveyor 14 comprises end sprockets 102 and 104, over which conveyor chains 106, 108 and 110 (FIG. 5) are respectively trained. The sprockets 102 and 104 are respectively mounted on shafts 112 and 114 and one of those shafts is driven from a suitable power source (not shown), in timed relation to the opeartion of the feed conveyor 2 of the trimmer section. On the chains 106 and 108 of the conveyor 14 a plurality of supports 116 (FIG. 5) are mounted and guided by rollers 118 on tracks 120. Each of supports 116 has mounted thereon a hydraulic motor 122. The hydraulic motors 122 may be of any conventional or appropriate design and they will not be described in detail. However, each such motor 122 is provided with a fluid inlet conduit 124 and an outlet conduit 126. Each of the conduits 124 and 126 comprises a flexible tubing capable of transmitting fluid under pressure and each is connected at its remote end to a rotary manifold 128 (FIG. 2) rotatably mounted adjacent the husker section. The rotary manifold 128 is illustrated only by dotted line since construction of devices of this type are well known and the details thereof form no part of the present invention. However, the rotary manifold 128 is of such nature that it provides hydraulic fluid under pressure in each of the lines 124 and is arranged to return spent hydraulic fluid from lines 126 to a reservoir or sump for recirculation. In general, the rotary manifold 128 may be similar to the rotary manifold 72, descirbed in connection with FIG. 1 in that the two will be provided with suitable rotary glands for connection to a stationary source of fluid pressure.

As shown in FIG. 5, each hydraulic motor 122 is provided with a control valve device 130 having a cam follower roller 132 thereon. The frame of the machine is provided with a cam track 134 adjacent the conveyor chain 106. The cam track 134 extends only along the upper run of the conveyor 14. As each support 116 and its motor 122 reaches the start of the upper run of the conveyor 14, its roller 132 engages the cam track 134 to so actuate valve 130 as to admit fluid under pressure from line 124 to the hydraulic motor 122 and to start the same in operation.

FIG. 6 is a plan view of one of the hydraulic motors and attendant structures and wherein 136 designates a rotary output shaft from the hydraulic motor. That shaft extends through suitable bearing means 138 on support 116 and across the conveyor 14 to an outboard bearing 140 supported by a bracket 139 on conveyor chain 110. The support 116 and conveyor chain 110 carry further bearings 142 and 144 on which a second transverse shaft 146 is journalled. The shafts 136 and 146 have fixed thereto meshing spur gears 148 and 150 whereby the motor 122 drives both shafts in rotation but in opposite directions. The bearings 142 and 144 are adjustably mounted on support 116 and bracket 139, respectively, for adjustment toward and from bearings 138 and 140 to thereby adjust the width of the nip between the husking rolls to be described. Each shaft 136 and 146 is provided with a husking roll thereon. Those rolls are identified as 152 and 154 and may be of any known or conventional construction, since pairs of husking rolls are known to the art. It is contemplated, however, that they be provided with outer surfaces of such texture and composition as to readily grip corn husks and draw the same downwardly through the nip 156 of the rolls, in a known manner, without abrading or damaging exposed kernels of corn.

The cam track 134 terminates adjacent the terminal end of the upper run of the conveyor 14 so that the husking rolls are driven in rotation, in the directions indicated by the arrows in FIG. 2, only while travelling along the upper or forward run of conveyor 14.

The upper conveyor 12 of the husking section, briefly descirbed previously, comprises three endless chains (FIG. 5) 158, 160 and 162. These conveyor chains are trained over end sprockets 164 and 166 (FIG. 2) defining arcuate end portions of the conveyor 12. Spaced along the chains 158 and 160 and carried thereby are brackets 168 supporting bearing blocks 169. The chains 158, 160 and 162 are guided along their paths by fixed tracks 170 mounted on the machine frame. The sprockets around which those chains are trained are fixed respectively to shafts 172 and 174 and are driven by suitable means, not shown, so that the lower or forward run of the conveyor 12 moves at the same linear speed as the forward run of the conveyor 14. The upper conveyor chain 162 has mounted thereon a plurality of brackets 176 supporting bearing blocks 177 aligned with corresponding bearing blocks 168 and in the aligned bearings 169 and 177 a transverse shaft 178 is journalled. As is evident from FIG. 2, the shafts 178 are intermediate the pairs of husking rolls 152 and 154 on the conveyor 14 therebelow. Fixed to each shaft 178 are rotary brushes 180 of such diameter as to substantially reach the outer periphery of the husking rolls 152 and 154 therebelow, all as clearly shown in FIG. 2. Also fixed to shaft 178, adajacent the left-hand brush 180 is a grooved friction pulley 182. Fixedly mounted on the machine frame is a rail 184 to which a section of friction V-belt 186 is secured to extend along the path of movement of the lower or forward run of upper conveyor 12 in position to frictionally engage within the groove 185 of pulley 182. As shown in FIG. 2, the rail 184 and belt section 186 extend only along a substantial portion of the forward run of conveyor 12. As will be obvious, operation of the conveyor 12 will cause successive pulleys 182 to frictionally engage the belt section 186 and as the conveyor moves along its forward run, the frictional engagement described will cause rotation of shafts 178, all in the same direction as shown by the arrows in FIG. 2. The ends of the rail 186 are curved upwardly, as shown in FIG. 2 at 188 so as to ensure smooth engagement and disengagement from the pulleys 182.

As previously stated, the machine illustrated contemplates two parallel and adjacent duplicate conveyor and processing systems whereby two rows of corn are trimmed and husked simultaneously. As shown in FIG. 5, a single brush shaft 178 and pulley 182 is provided, with both brushes 180 on the same shaft. Only the left-hand conveyor 12 has two chains, 158 and 160, while the right-hand conveyor needs only one chain 162. In like manner the husking rolls 152 and 154 extend completely across and serve both sides of the machine, and only one motor 122 is needed for both sides. The right-hand conveyor 14 needs only one chain 110 rather than two chains like 106 and 108.

It is to be noted that the peripheries of adjacent brushes 180 are substantially tangent while the brushes are moving along the forward run of the conveyor 12 but are separated a substantial distance apart as the brushes move around the arcuate end portions of that conveyor.

The speed of operation and phase of the drive to the conveyors 12 and 14 is such that an ear of trimmed but unhusked corn delivered by the delivery device 10 to the husking section will enter between spaced apart brushes 180 while they are on the forward arcuate portion of their paths, as clearly illustrated in FIG. 2. As those brushes approach the forward run of the conveyor, they move closer together and will both then engage the ear of corn delivered therebetween. By the time the brushes reach their working positions relative to each other, the ear of corn is delivered from the lower edge of delivery plates 94 onto a pair of husking rolls 152–154, already described, and the brushes, husking rolls and ear of corn will be in the relative positions shown in FIG. 2. After the parts reach this described relationship, the valve controlling rollers 132 engage cam track 134 and start the hydraulic motors 122. At about the same time the pulleys 182 engage the leading end of fixed belt section 186 to start the brushes 180 in rotation.

Extending along the path of movement of the tip ends of the ears of corn on the husking rollers, along the center line of the machine, is a manifold 200 (FIG. 5) provided with lateral openings 202 at substantially the level of the axis of an ear of corn on the husking rollers, and directed toward the tip ends thereof. The manifold 200 is supplied with air under high pressure from any suitable source and it will be apparent that the openings 202 will direct high pressure jets of air onto the tip ends of the trimmed but unhusked ears of corn moving through the husking section. The jets of air will engage under the trimmed tip ends of the husk and silk and loosen the same from the ear of corn and will assist the brushes 180, which further loosen and partly remove the husks and silk.

As will be evident from the arrows of FIG. 2, the husking rolls 152 and 154 rotate in opposite directions and they, therefore, have substantially no influence on the rotation of the ears of corn supported thereby. However, since the brushes 180 engaging that same ear of corn rotate in the same direction, they will both tend to rotate an ear of corn in a counter-clockwise direction, as seen in FIG. 2, thus rolling the ear over gently while continually brushing the same so that the loosened husks can be gripped in the nip of the husking rolls and withdrawn downwardly, as indicated at 204, and discharged into a suitable receptacle, not identified. The described operation continues until the ears of corn reach the end of the forward runs of the conveyors 12 and 14, at which tmie rotation of the hydraulic motors is stopped by the valve rollers 132 passing off the end of cam track 134 and rotation of the brushes 180 stops since the pulleys 182 have then passed the end of the belt section 186. The brushes then start to move upwardly to start their return run and the supports 116 and husking rolls start to move downwardly to commence their return run. However, the husked and cleaned ears of fresh corn continue to rest on the husking rolls and as the same are tilted, as shown at the left of FIG. 2, the ears of corn would drop therefrom and would likely be bruised and damaged. To prevent the ears from dropping off the husking rolls too soon, a hold-down mechanism 16 is provided. The hold-down mechanism comprises a transverse shaft 206 mounted on the machine frame and on which downwardly and outwardly extending arms 208 are carried. At the lower ends of the arms 208 a cross-shaft 210 is fixed. Secured in fixed relation to the arms 208 are upper arms 212. Each of the shafts 206 and 210 are provided with spaced rollers 214 and 216 thereon, those rollers being arranged in aligned pairs and over each pair a flexible belt 218 is trained. The belts 218 are quite flexible and very loose on the pulleys and an idler pulley 220 is drawn upwardly and outwardly by rod 222 and spring 224 to gently tighten the belt 218. As shown, the belts 218 engage the ears of cleaned corn on the rollers 152 and 154 and hold the ears in position thereon until they reach a lower level where they may be safely deposited in transverse pockets on the take-away conveyor 18, previously referred to. A plurality of the belts 218 are provided in side-by-side relation so as to engage an ear of corn at several points therealong and ensure firm but gentle retention of the same on the husking rollers. The arms 208 and 212 are fixed relative to each other but are freely pivoted on the shaft 206 so that the entire belt assembly is gravity actuated, permitting it to rise and fall in response to changing sizes of the ears of corn and to limit the pressure applied to the corn.

While a single specific example of this machine is shown and described herein, it is to be understood that the same is merely illustrative of the principles involved and that other embodiments may be resorted to. For example, the second conveyor in the trimming section carrying the pneumatic pushers and the arrangement shown for applying air under pressure to those pushers is only illustrative and any suitable form of pushing device may be employed whether it be mechanical, electrical or pneumatic. Likewise, the arrangement shown for driving the hydraulic motors 122 may be replaced by other suitable driving means and controls. The appended claims define those features and principles applicant considers to be his invention.

I claim:
1. A fresh corn trimming and husking machine comprising: a conveyor; a corn carrier on said conveyor and having upwardly diverging side walls defining a generally V-shaped trough extending transversely of said conveyor; an upstanding abutment on the inner face of each of said walls, at one end thereof; said abutments defining a V-shaped shoulder for engaging and positioning the butt end kernels on an ear of unhusked corn positioned in said trough; and a butt trimmer device mounted on said machine adjacent the path of travel of said conveyer and positioned to cut said ear and husk adjacent but inwardly of said shoulder.

2. A machine as defined in claim 1 wherein said side walls are provided with aligned slots adjacent said shoulder, said butt trimmer device being positioned to pass through said slots as the trough moves therepast to completely sever said ear and husk.

3. A machine for trimming and husking ears of fresh corn having butt ends and tip ends with husks projecting therefrom, comprising: a conveyor; a corn carrier on said conveyor and having upwardly diverging side walls defining a generally V-shaped trough extending transversely of said conveyor; an abutment on said machine adjacent the path of movement of one end of said trough; pusher means mounted for movement along the path of said conveyor and having a pusher head movable lengthwise of and within said trough for engaging and pushing the butt end of an ear of corn therein toward said one end to firmly press the tip end of said ear against said abutment; means for pushing said pusher head with sufficient force to cause said abutment to fold projecting husks laterally at said tip end and press the kernels at the tip end of the corn against said abutment; and cutting means on said machine adjacent said abutment, positioned to cut the tip end of the ear and husk as it moves therepast.

4. A machine as defined in claim 3 wherein said abutment is stationary, elongated in the direction of conveyor movement and spaced from the adjacent end of said trough, said cutting means being positioned between said abutment and said end of said trough.

5. A machine as defined in claim 3 wherein said pusher means is mounted on a carrier mounted for movement along a path adjacent said conveyor and includes fluid motor means for moving said pusher head along said trough.

6. A machine as defined in claim 5 including means responsive to movement of said carrier along said path for actuating said fluid motor.

7. A fresh corn trimming and husking machine comprising: a conveyor; means on said conveyor for carrying an ear of unhusked corn extending transversely of said conveyor; means on said conveyor for engaging and positioning the butt end of said ear adjacent one edge of said conveyor; a butt cutter adjacent said one edge for cutting the butt end of said ear as said conveyor moves therepast; pusher means downstream from said butt cutter for engaging the cut butt end of said ear and pushing said ear across said conveyor toward the other side thereof; abutment means adjacent said other side of said conveyor for engaging the tip end of said ear pushed by said pusher means to laterally position the tip end of said ear in predetermined relation to said abutment means; and a tip cutter positioned adjacent said other side of said conveyor for cutting said tip end in a predetermined relation to said abutment as said conveyor moves therepast.

8. A fresh corn trimming and husking machine comprising: carrier means for moving an ear of unhusked corn along a portion of a predetermined path with said ear extending transversely of said path; means at one side of said path for cutting off the butt end of said ear and husk; means for moving said ear toward the other side of said path and for cutting off the tip end of said ear and husk; husking means movable along a succeeding portion of said path and comprising a pair of adjacent rollers extending transversely of said path; means for rotating said rollers about their axes as they move along said path; means for delivering said cut ear from said first portion of said path to a position resting on said rollers to be carried thereby; and means adjacent said path for loosening said husk from said ear to be engaged in the nip of said rollers and stripped from said ear.

9. A machine as defined in claim 8 wherein said means for loosening said husk comprises means for directing a jet of air, from one side of said path, against an end of said ear on said rollers.

10. A machine as defined in claim 8 wherein said means for loosening said husk includes a rotary brush movable along a path over the path of movement of said ear on said rollers with said brush engaging said ear, and means for rotating said brush as it moves along its path.

11. A machine as defined in claim 8 wherein said carrier means comprises a generally V-shaped trough for holding said ear therein, the sides of said trough having a plurality of aligned slots therein; said means for delivering said cut ear comprising guide means having extending fingers arranged to pass through said slots and engage the underside of said ear in said trough and lift said ear therefrom and guide the same to said position on said rollers.

12. A fresh corn trimming and husking machine comprising: a first conveyor; a pair of adjacent husking rolls journalled on and above said conveyor with their axes extending transversely thereof; motor means on said conveyor for simultaneously rotating said rollers about their axes; means for holding an ear of corn on and mutually supported by said rollers; and means at one side of said conveyor for directing a jet of air axially against an end of said ear of corn as said rotating rollers move therepast.

13. A fresh corn trimming and husking machine comprising: a first conveyor; a pair of adjacent husking rolls journalled on and above said conveyor with their axes extending transversely thereof; motor means on said conveyor for simultaneously rotating said rollers about their axes; a second conveyor above and parallel to said first conveyor; a pair of adjacent rotary brushes journalled on and below said second conveyor on transverse axes and in position to engage an ear of corn resting on said rollers; and means for moving said conveyors in the same direction at the same speed and for simultaneously rotating said brushes in the same direction about their axes.

14. A machine as defined in claim 13 wherein said means for rotating said brushes comprises; a pulley fixed in coaxial relation to each brush and rotatable therewith, an elongated stationary friction member extending along the path of movement of said second conveyor and positioned to frictionally engage peripheral portions of said pulleys whereby said brushes are caused to rotate thereby in response to movement of said second conveyor.

15. A machine as defined in claim 14 wherein said first and second conveyors are endless conveyors each having a forward run, a return run and arcuate end portions, the forward run of said second conveyor being below its return run; and guide means for guiding and holding an ear of unhusked corn between said brushes when said brushes are on said arcuate portion and approaching said forward run and for releasing said ear to rest on said rollers as said rollers and brushes reach their respective forward runs.

16. A machine as defined in claim 13 wherein said first conveyor in an endless conveyor having an upper forward run, a lower return run and arcuate end portions, and means adjacent that arcuate portion at the end of said forward run for engaging and applying light pressure to an ear of corn on said husking rolls throughout a major portion of said arcuate portion, to hold said ear from dropping off said rolls.

17. The method of trimming the tip of an unhusked ear of corn having a butt end and a tip end with husk portions extending axially outwardly beyond the tip end of said ear, comprising the steps of: supporting said unhusked ear for movement in the direction of its length; forcibly pushing said ear to impinge its tip end against a fixed abutment with sufficient force to fold said extending husk portions laterally and press the tip of said ear firmly against said abutment; and cutting said extending husk portions and the tip of said ear from the remainder of said ear at a predetermined distance from but adjacent said abutment.

18. The method of claim 17 including the step of moving said ear, laterally of its length, while forcing the same against said abutment and performing said cutting step at a fixed station while said ear is sliding along said abutment.

References Cited

UNITED STATES PATENTS

| 1,083,693 | 1/1914 | Morral | 146—84 |
| 1,121,937 | 12/1914 | Morral | 130—5 |
| 1,927,957 | 9/1933 | Sells et al. | 130—5 |
| 2,037,661 | 4/1936 | Knight | 130—5 |
| 3,349,822 | 10/1967 | Rauth | 146—78 |

ANTONIO F. GUIDA, *Primary Examiner.*

U.S. Cl. X.R.

146—84